Sept. 9, 1930. R. O. BOYKIN 1,775,155
TOP FEED FOR ROTARY FILTERS
Filed Nov. 28, 1927

INVENTOR:
ROBERT O. BOYKIN,
BY
ATTORNEY.

Patented Sept. 9, 1930

1,775,155

UNITED STATES PATENT OFFICE

ROBERT O. BOYKIN, OF LOS ANGELES, CALIFORNIA, ASSIGNOR TO ALEX MILLS, OF LOS ANGELES, CALIFORNIA

TOP FEED FOR ROTARY FILTERS

Application filed November 28, 1927. Serial No. 236,207.

My invention relates to vacuum filters and more particularly to rotary vacuum filters.

Rotary vacuum filters in common use include a drum having a filter screen or cloth provided on the periphery thereof, and having an annular vacuum space formed just under the filter cloth. The drum is rotated on a hollow shaft connected with a vacuum pump and which is connected, through pipes in the drum, to said vacuum space so as to set up a vacuum in this space. A mixture of liquid and solids to be filtered is held in contact with the filter cloth while the drum is rotated. The cake of solids forming on the filter cloth is removed by suitable scrapers, while the liquids pass through the filter cloth and are discharged by the vacuum pump.

In filtering certain mixtures with a rotary vacuum filter, it has been found advantageous to apply the mixture to the drum so that the filter screen first contacts the lower part of the mixture where the heavier particles thereof have settled. In order to accomplish this, means have been provided to confine a body of mixture in contact with a portion of the upper half of the drum, the latter being rotated on a horizontal axis. Considerable difficulty has been had with the devices heretofore used for this purpose.

It is correspondingly an object of my invention to provide a novel, simple, and effective means for retaining a body of mixture to be filtered in contact with an upper portion of the screen of a rotary vacuum filter.

In order that the burden placed upon the vacuum pump connected to the filter drum be not excessive, the interior of the drum is divided into compartments and a valve automatically shuts off each compartment from the pump when that portion of the filter screen disposed thereover is not in contact with the mixture nor covered with a cake, and connects each compartment with the pump as that portion of the screen disposed thereover comes in contact with the mixture.

The screen portion over each compartment is thus partially exposed to the atmosphere after it has been connected with the pump, which permits a large amount of air to enter the compartment before it moves entirely beneath the mixture, thus materially decreasing the vacuum efficiency of the filter.

It is an object of my invention to provide a seal for substantially excluding the atmosphere from the screen of a rotary vacuum filter during a certain portion of its travel.

It is a further object of my invention to provide a seal for covering the screen over each compartment of a rotary vacuum filter as this is entering engagement with a mixture to be filtered so that the atmosphere will be substantially excluded from said compartment, while a vacuum is being imposed thereon.

It is a still further object to provide such a seal which does not rub on the screen so as to damage it.

In former devices for retaining a body of mixture against the screen of a rotary vacuum filter, end walls were employed which slid in a groove formed in the periphery of the ends of the drum. These grooves filled up with mixture, causing the device to operate very unsatisfactorily.

It is another object to provide, in a device for retaining a body of mixture against the screen of a rotary vacuum filter, a novel, simple, and effective means for keeping the mixture from overflowing the ends of the drum.

Further objects and advantages will be made manifest in the following description and accompanying drawings in which a preferred embodiment of my invention is diagrammatically illustrated. In the drawings.

Figure 1:
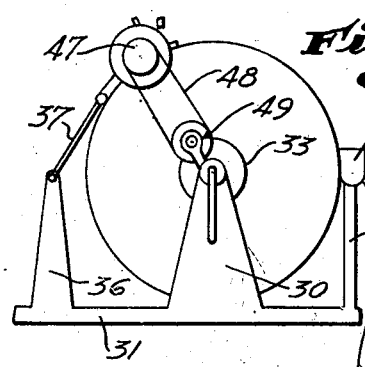
Fig. 1 is a side elevational view diagrammatically illustrating the rotary vacuum filter of my invention.

Referring specifically to the drawings:

Fig. 1 diagrammatically shows a rotary filter 10, which includes a filter drum 11 having a cylindrical felly 12, on the ends of which are provided radial walls 13 between which are disposed perforated filter screen supports 14 and solid vacuum compartment partitions 15. Resting upon and secured to the outer edges of the walls 13, the supports 14, and the compartment partitions 15, is a filter screen 18. The filter screen 18 is of the usual construction and may be formed of a wire screen or of a suitable cloth fabric.

As shown in Fig. 1, the compartment partitions 15 are equally spaced about the felly 12 so as to provide a series of vacuum compartments 25 of equal size.

The felly 12 is adapted to be connected to and supported upon a hub 20 by spoke pipes 21 which connect the vacuum compartments 25 to an interior bore of the hub 20. The hub 20 is mounted upon a stationary hollow axle 26 which has a port 27 formed therein, which connects successively with the vacuum compartments 25, as these move into a certain position relative to the axle 26.

The axle 26 is supported upon standards 30 provided on a base 31. Any suitable means may be provided on the drum 11 for rotating this on the axle 26. Provided centrally on one side of the drum 11 is a ring gear 33, for a purpose to be described later.

A means for holding a body of mixture to be filtered against the screen 18 is embodied in a mixture distributor 35 which is supported upon the upper end of a standard 36 provided on the base 31. Pivotally mounted on the upper end of the standard 36, and extending upward just outside of the radial walls 13 of the drum 11, are struts 37 which are provided with bearings 38 and 39. Mounted on a shaft 40, the ends of which journal in the bearings 38, is a pulley 41. Mounted on a shaft 45, which extends through and journals in the bearings 39, is a pulley 46. Mounted on an end of the shaft 45 is a sprocket wheel 47. The pulley 46 is adapted to be driven through the shaft 45 by the sprocket 47. The sprocket 47 may be driven as by a chain 48 passing around the sprocket 47 and a drive sprocket of a system of gears 49, which is connected to the ring gear 33. Formed on the opposite ends of the pulley 46 are discs or flanges 50 which are disposed close to annular beads 51 provided on the outer surfaces of the radial drum walls 13 just within the periphery thereof. Extending around the pulleys 41 and 46 is an impervious endless belt 54, the width of which is such that the side edges of the belt 54 contact the flanges 50. The lower flight of the belt 54, as clearly shown in Fig. 2, lies against the screen 18.

Extending upward from the struts 37, at points adjacent the bearings 39, are supports 56 which connect with extensions 57 formed laterally from the upper edge of a back plate 59. The plate 59 inclines forward so that the lower edge 60 thereof contacts the belt 54 where this passes around the pulley 46. The width of the plate 59 is such that its side edges are disposed close to the inner surfaces of the flanges 50. Disposed along the side edges of the plate 59, so as to contact the flanges 50, are scrapers 64 which are preferably formed of fiber and are triangular in cross-section and which are secured to the plate 59 as by riveting. Extending forward from the bearings 39 are supporting bars 66 which turn inward and reversely at their ends to form fingers 67, to which are secured, as by riveting, sealing members 68. The sealing members 68 are slightly arcuate in form and triangular in cross-section so as to lie in the angles formed between the surface of the screen 18 and the inner surfaces of the flanges 50.

Figure 2:
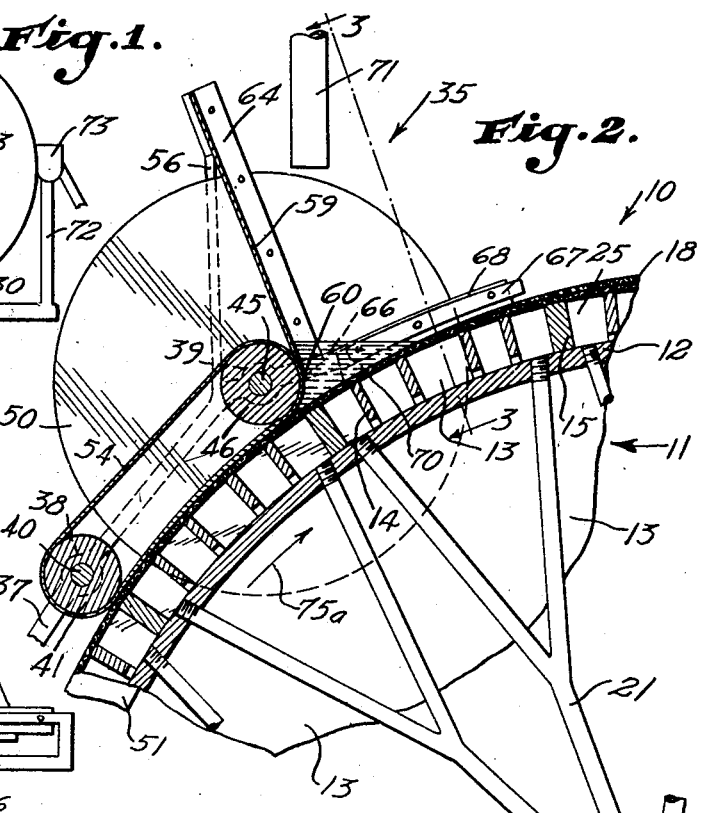
Fig. 2 is an enlarged fragmentary vertical sectional view illustrating the main features of my invention.
Figure 4:
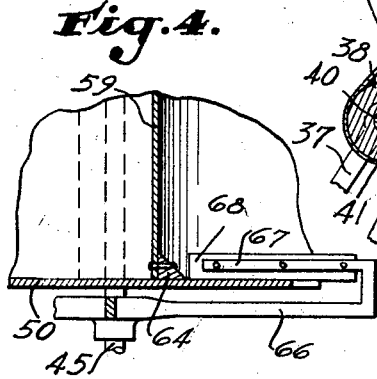
Fig. 4 is a horizontal sectional view taken on the line 4—4 of Fig. 3.

As shown in Fig. 2, a body of mixture 70 to be filtered is disposed in the pocket formed by the screen 18, the belt 54, and the flanges 50. This mixture is adapted to be supplied to this pocket through a chute 71.

Supported on a standard 72, which extends upward from the base 31, is a scraper 73 for removing any cake which may form upon the screen 18.

The operation of my invention is as follows:

The body of mixture 70, having been supplied through the chute 71, this mixture rests upon the screen 18, as shown in Fig. 2. The vacuum pump, connected with the hollow axle 26, is placed in operation so as to impose a vacuum upon the compartments 25, the spoke pipes 21 of which are in communication with the axle port 27.

The drum 11 is now rotated very slowly in the direction of the arrow 75$^a$, which causes the pulley 46 to be rotated so that the lower flight of the belt 54 travels at substantially the same speed as the screen 18. It will be noted that the port 27 is so located that evacuation of the air from each of the compartments 25 is not commenced until that compartment is substantially entirely beneath the lower flight of the belt 54. Owing to the impervious character of this belt 54, that portion of the screen 18 which covers the compartment 25 disposed beneath the belt 54, is sealed from the atmosphere and thus the work of the vacuum pump in forming the vacuum in this compartment 25 is confined entirely to extracting air already present in that compartment.

As each compartment 25 moves upward from the position in which it is disposed beneath the belt 54, it comes under the body of mixture 70. The vacuum draws the liquid portions of the mixture 70 through the screen 18, these being discharged by the vacuum pump. The solid ingredients of the mixture 70 accumulate on the screen 18 to form a cake which is removed by the scraper 73.

Figures 3, 5:
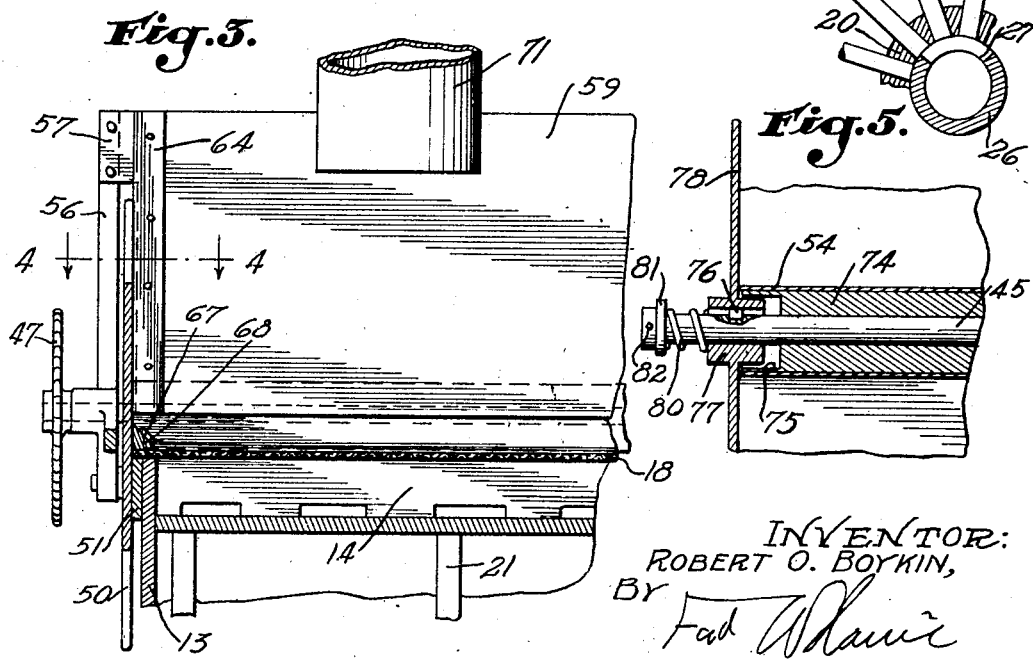
Fig. 3 is a sectional view taken on the line 3—3 of Fig. 2.
Fig. 5 is a sectional view of an alternative form of pulley construction.

To compensate for any wear between the flanges 50 and the scrapers 64 and the sealing members 68, an alternative form of pulley construction is provided, as illustrated in Fig. 5, in which the flanges are not integral with the pulley. In this form, a pulley body 74 is rotatably mounted on the shaft 45 and has formed in each of its ends a cylindrical bore 75. The length of the pulley body 74 is slightly less than the width of the belt 54. Non-rotatably attached to the shaft 45 by a key 76 is a hub 77 of slightly less diameter than the bore 75 of the pulley body 74. On the hub 77, a flange 78 is integrally formed. The hub 77 is longitudinally slidable on the shaft 45. The hub 77 and the flange 78 are forced resiliently inward by a spring 80 on the shaft 45, engaging the hub 77. The opposite end of the spring 80 engages a collar 81, attached to the end of the shaft 45 as by a set-screw 82. As the scrapers 64 or the sealing members 68 are worn by contact with the flanges 78, the hub 77 and the flanges 78 are forced inward by the action of the spring 80 so that the flanges 78 maintain a fluid-tight seal with the scrapers 64 and the sealing members 68.

I claim as my invention:

1. In a rotary vacuum filter, the combination of: a filter medium; means for moving said filter medium; means for positioning a body of mixture to be contacted by said medium at a certain position in its movement, said body of mixture being supported upon said filter medium; means for forming a vacuum under a portion of said medium as said portion approaches said mixture; and means for sealing said portion from the atmosphere while it is moving into contact with said mixture, said sealing means moving with said medium.

2. In a rotary vacuum filter, the combination of: a filter medium; means for rotating said filter medium; means for positioning a body of mixture to be contacted by said medium at a certain position in its rotation, said body of mixture being supported upon said filter medium; means for forming a vacuum under a portion of said medium as said portion approaches said mixture; and means for sealing said portion from the atmosphere while it is moving into contact with said mixture, said sealing means moving with said medium.

3. In a rotary vacuum filter, the combination of: a filter medium; means for moving said filter medium; means for positioning a body of mixture to be contacted by said medium at a certain position in its movement, said body of mixture being supported upon said filter medium; means for forming a vacuum under a portion of said medium as said portion approaches said mixture; and an endless belt for sealing said portion from the atmosphere while it is moving into contact with said mixture.

4. In a rotary vacuum filter, the combination of: a filter medium; means for moving said filter medium; means for positioning a body of mixture to be contacted by said medium at a certain position in its movement, said body of mixture being supported upon said filter medium; means for forming a vacuum under a portion of said medium as said portion approaches said mixture; and an endless belt for sealing said portion from the atmosphere while it is moving into contact with said mixture, said belt lying against and moving with said medium.

5. In a rotary vacuum filter, the combination of: a filter medium; means for moving said filter medium; an endless belt; means for supporting said belt against said medium to seal a portion of said medium from the atmosphere; and means cooperating with said belt to retain a body of mixture to be filtered in contact with said medium, said body of mixture being supported upon said filter medium.

6. In a rotary vacuum filter, the combination of: a filter medium; means for moving said filter medium; an endless belt; a pulley for supporting said belt against said medium to seal a portion of said medium from the atmosphere; and means cooperating with said belt to retain a body of mixture to be filtered in contact with said medium, said body of mixture being supported upon said filter medium.

7. In a rotary vacuum filter, the combination of: a filter medium; means for moving said filter medium; an endless belt; a pulley for supporting said belt against said medium to seal a portion of said medium from the atmosphere; and a flange formed on said pulley and cooperating with said belt to retain a body of mixture to be filtered in contact with said medium.

8. In a rotary vacuum filter, the combination of: a filter medium; means for moving said filter medium; an endless belt; a pulley for supporting said belt against said medium to seal a portion of said medium from the atmosphere; a flange formed on said pulley and cooperating with said belt to retain a body of mixture to be filtered in contact with said medium; and means for removing mixture adhering to said flange.

9. In a rotary vacuum filter, the combination of: a filter medium; means for moving said filter medium; an endless belt; a pulley for supporting said belt against said medium to seal a portion of said medium from the atmosphere; and a flange formed on said pulley and rotating therewith close to an edge of said means for moving said filter medium and cooperating with said belt to retain a body of mixture to be filtered in contact with said medium.

10. In a rotary vacuum filter, the combination of: a filter medium; means for moving said filter medium; an endless belt; a pulley for supporting said belt against said medium to seal a portion of said medium from the atmosphere; a flange formed on said pulley and rotating therewith close to an edge of said means for moving said filter medium and cooperating with said belt to retain a body of mixture to be filtered in contact with said medium; and means for removing mixture adhering to said flange.

11. In a rotary vacuum filter, the combination of: a filter medium; means for moving said filter medium; an endless belt; a pulley for supporting said belt against said medium to seal a portion of said medium from the atmosphere; a flange formed on said pulley and rotating therewith close to an edge of said means for moving said filter medium and cooperating with said belt to retain a body of mixture to be filtered in contact with said medium; and means for forming a seal between said flange and said first-named means.

12. In a rotary vacuum filter, the combination of: a filter medium; means for moving said filter medium; an endless belt; a pulley for supporting said belt against said medium to seal a portion of said medium from the atmosphere; a flange formed on said pulley and rotating therewith close to an edge of said means for moving said filter medium and cooperating with said belt to retain a body of mixture to be filtered in contact with said medium; means for forming a seal between said flange and said first-named means; and means for removing mixture adhering to said flange.

13. In a rotary vacuum filter, the combination of: a filter medium; means for moving said filter medium; an endless belt; a pulley for supporting said belt against said medium to seal a portion of said medium from the atmosphere; a flange associated with said pulley and rotating therewith close to an edge of said means for moving said filter medium and cooperating with said belt to retain a body of mixture to be filtered in contact with said medium; means for forming a seal between said flange and said first-named means; and means for compensating for the wear of said sealing means to maintain said seal.

14. In a rotary vacuum filter, the combination of: a filter medium; means for moving said filter medium; means for positioning a body of mixture to be contacted by said medium at a certain position in its movement, said body of mixture being supported upon said filter medium; means for forming a vacuum under a portion of said medium as said portion approaches said mixture; means for sealing said portion from the atmosphere while it is moving into contact with said mixture, said sealing means moving with said medium; and means connecting said filter medium to said sealing means for moving said sealing means.

15. In a rotary vacuum filter, the combination of: a filter medium; means for rotating said filter medium; means for positioning a body of mixture to be contacted by said medium at a certain position in its rotation, said body of mixture being supported upon said filter medium; means for forming a vacuum under a portion of said medium as said portion approaches said mixture; means for sealing said portion from the atmosphere while it is moving into contact with said mixture, said sealing means rotating with said medium; and means connecting said filter medium to said sealing means for rotating said sealing means.

In testimony whereof, I have hereunto set my hand at Los Angeles, California, this 19th day of November, 1927.

ROBERT O. BOYKIN.